United States Patent
Bernard

(10) Patent No.: US 11,111,010 B2
(45) Date of Patent: Sep. 7, 2021

(54) MULTIMODAL UNMANNED AERIAL SYSTEMS HAVING TILTABLE WINGS

(71) Applicant: Textron Innovations Inc., Providence, RI (US)

(72) Inventor: Guy Bernard, Kirkland (CA)

(73) Assignee: Textron Innovations Inc., Providence, RI (US)

( * ) Notice: Subject to any disclaimer, the term of this patent is extended or adjusted under 35 U.S.C. 154(b) by 402 days.

(21) Appl. No.: 16/383,884

(22) Filed: Apr. 15, 2019

(65) Prior Publication Data

US 2020/0324885 A1    Oct. 15, 2020

(51) Int. Cl.
  *B64C 27/26* (2006.01)
  *B64C 29/02* (2006.01)
  *B64C 39/02* (2006.01)

(52) U.S. Cl.
  CPC .............. *B64C 27/26* (2013.01); *B64C 29/02* (2013.01); *B64C 39/024* (2013.01); *B64C 2201/104* (2013.01); *B64C 2201/108* (2013.01)

(58) Field of Classification Search
  CPC ........ B64C 2201/021; B64C 2201/088; B64C 2201/086; B64C 2201/104; B64C 2201/165; B64C 2201/108; B64C 27/26; B64C 29/02; B64C 39/024; B64C 39/12; B64D 27/26; B64D 27/06; G05D 1/0858
  See application file for complete search history.

(56) References Cited

U.S. PATENT DOCUMENTS

| 3,350,035 A * | 10/1967 | Schlieben | B64C 39/062 244/7 R |
| 4,913,377 A * | 4/1990 | Eickmann | B64C 27/08 244/17.11 |
| 5,863,013 A * | 1/1999 | Schmittle | B64C 29/0033 244/48 |
| 8,152,096 B2 * | 4/2012 | Smith | B64C 29/0033 244/60 |
| 8,602,348 B2 * | 12/2013 | Bryant | B64C 39/024 244/12.4 |

(Continued)

FOREIGN PATENT DOCUMENTS

| DE | 102016001771 A1 | 1/2017 |
| WO | 2016120833 A1 | 8/2016 |

OTHER PUBLICATIONS

European Search Report; Application No. 20157629.5; EPO; dated Sep. 16, 2020.

*Primary Examiner* — Medhat Badawi
(74) *Attorney, Agent, or Firm* — Lawrence Youst PLLC

(57) ABSTRACT

A multimodal unmanned aerial system includes a fuselage forming a payload bay, a control wing forward of the fuselage including a first plurality of propulsion assemblies and a primary wing aft of the fuselage including a second plurality of propulsion assemblies. The primary wing has a greater wingspan than the control wing. The multimodal unmanned aerial system includes linkages rotatably coupling the fuselage to the control wing and the primary wing. The fuselage, the control wing and the primary wing are configured to synchronously rotate between a vertical takeoff and landing flight mode and a forward flight mode. The fuselage, the control wing and the primary wing are substantially vertical in the vertical takeoff and landing flight mode and substantially horizontal in the forward flight mode.

19 Claims, 10 Drawing Sheets

(56) References Cited

U.S. PATENT DOCUMENTS

| | | | | |
|---|---|---|---|---|
| 8,616,492 B2* | 12/2013 | Oliver | ................ | B64C 29/0075 244/12.4 |
| 8,800,912 B2* | 8/2014 | Oliver | .................... | B64C 39/08 244/12.4 |
| 9,567,088 B2* | 2/2017 | Godlasky | ............. | B64C 39/024 |
| 9,694,911 B2* | 7/2017 | Bevirt | ................ | B64C 29/0033 |
| 9,963,228 B2* | 5/2018 | McCullough | ............ | B64C 1/32 |
| 9,994,313 B2* | 6/2018 | Claridge | ............... | B64C 39/024 |
| 10,011,351 B2* | 7/2018 | McCullough | ....... | B64D 1/22 |
| 10,124,890 B2* | 11/2018 | Sada-Salinas | ........... | B64D 1/02 |
| 10,183,746 B2* | 1/2019 | McCullough | ....... | B64C 29/0033 |
| 10,214,285 B2* | 2/2019 | McCullough | .......... | B64C 29/02 |
| 10,227,133 B2* | 3/2019 | McCullough | .......... | B64C 11/28 |
| 10,232,950 B2* | 3/2019 | McCullough | .......... | B64C 39/02 |
| 10,597,164 B2* | 3/2020 | Oldroyd | ................. | G05D 1/0072 |
| 2003/0080242 A1* | 5/2003 | Kawai | .................... | F02K 3/025 244/12.4 |
| 2007/0170307 A1* | 7/2007 | de la Cierva Hoces | ..................... | B64C 27/24 244/7 R |
| 2010/0252690 A1* | 10/2010 | Hothi | .................... | B64C 39/024 244/7 B |
| 2011/0001020 A1* | 1/2011 | Forgac | ................. | B64C 39/024 244/7 A |
| 2011/0042509 A1* | 2/2011 | Bevirt | ................ | B64C 29/0033 244/12.4 |
| 2011/0121570 A1* | 5/2011 | Bevirt | ....................... | F03D 5/06 290/44 |
| 2011/0303795 A1* | 12/2011 | Oliver | ................ | B64C 29/0033 244/7 R |
| 2012/0234968 A1* | 9/2012 | Smith | .................... | B64D 17/64 244/12.3 |
| 2012/0248259 A1* | 10/2012 | Page | ....................... | B64C 29/02 244/7 R |
| 2014/0008498 A1* | 1/2014 | Reiter | ..................... | B64C 29/00 244/7 A |
| 2015/0014475 A1* | 1/2015 | Taylor | ..................... | B64C 29/00 244/6 |
| 2015/0284079 A1* | 10/2015 | Matsuda | ............... | B64C 39/024 244/7 A |
| 2016/0207625 A1* | 7/2016 | Judas | .................. | B64C 29/0025 |
| 2017/0008625 A1* | 1/2017 | Olm | ........................... | B64C 3/56 |
| 2017/0021924 A1* | 1/2017 | Kubik | ..................... | B64C 27/48 |
| 2017/0283052 A1* | 10/2017 | Moshe | ................ | B64C 29/0033 |
| 2017/0297699 A1* | 10/2017 | Alber | ..................... | B64D 27/24 |
| 2017/0327219 A1* | 11/2017 | Alber | ..................... | H02S 20/00 |
| 2018/0002013 A1* | 1/2018 | McCullough | .......... | B64D 25/12 |
| 2018/0002026 A1* | 1/2018 | Oldroyd | ................. | B64D 27/12 |
| 2018/0265193 A1* | 9/2018 | Gibboney | ............... | B64C 39/08 |
| 2018/0297711 A1* | 10/2018 | Oldroyd | ................. | B64C 27/52 |
| 2019/0031333 A1* | 1/2019 | Groninga | ............ | B64C 29/0033 |
| 2019/0144108 A1* | 5/2019 | McCullough | ......... | B64C 39/024 244/23 B |
| 2021/0122468 A1* | 4/2021 | Morris | .................... | B64C 39/10 |

* cited by examiner

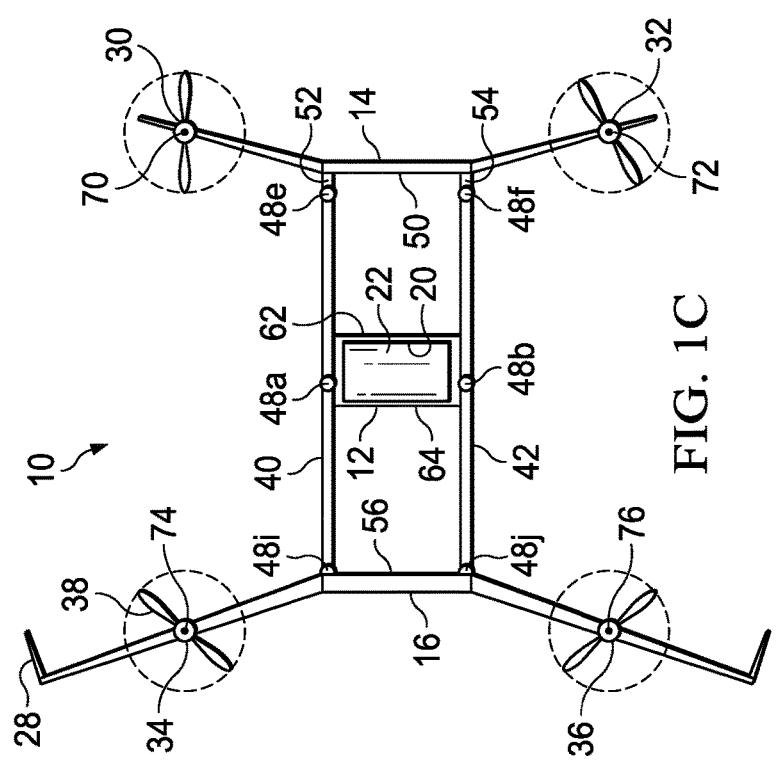
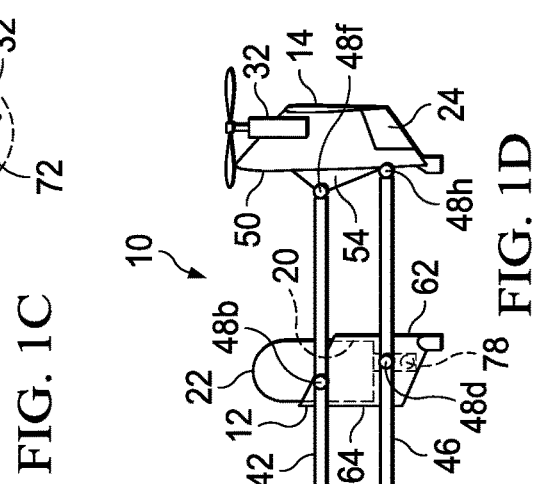
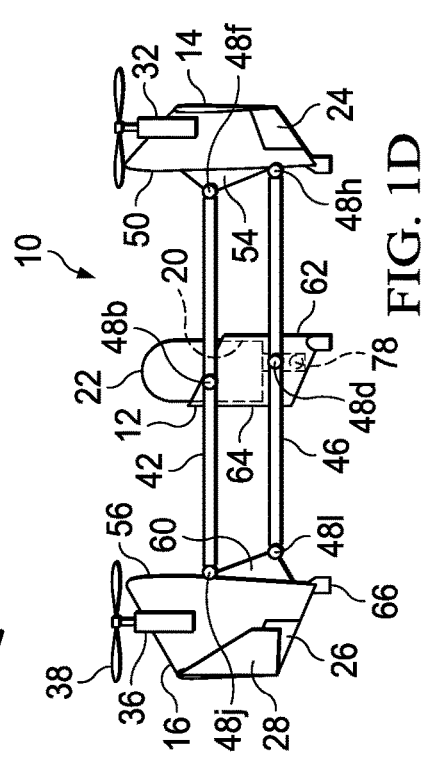
FIG. 1C
FIG. 1D
FIG. 1E

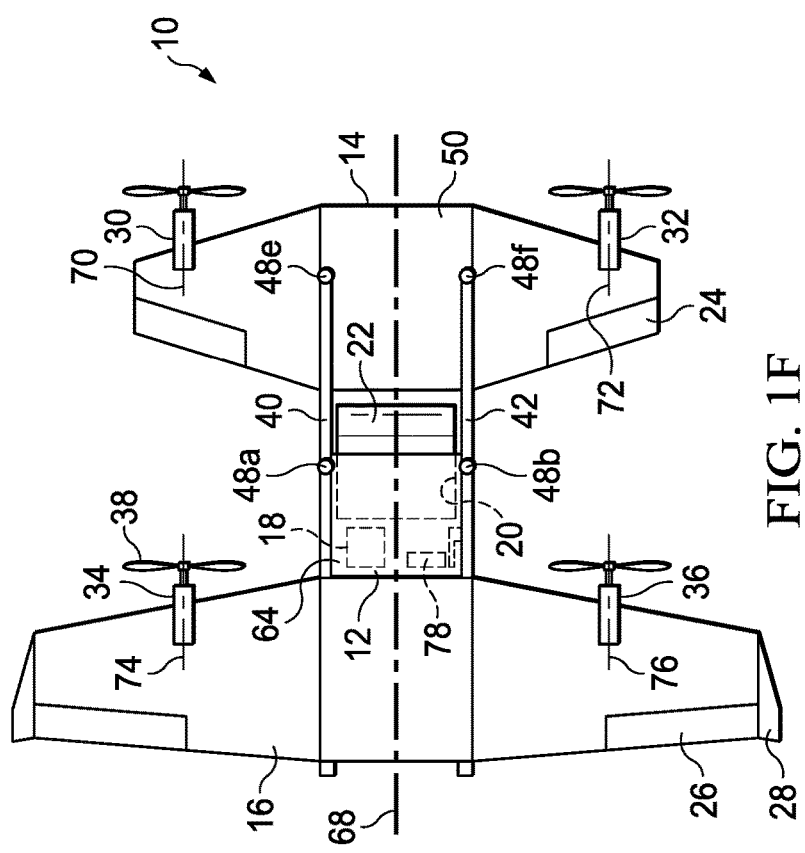
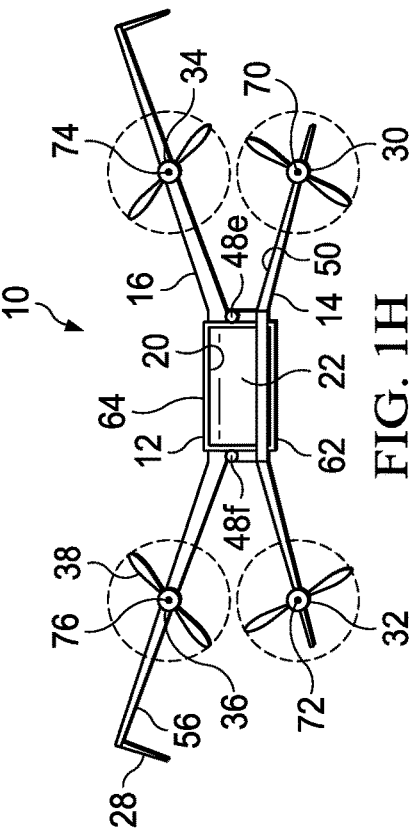
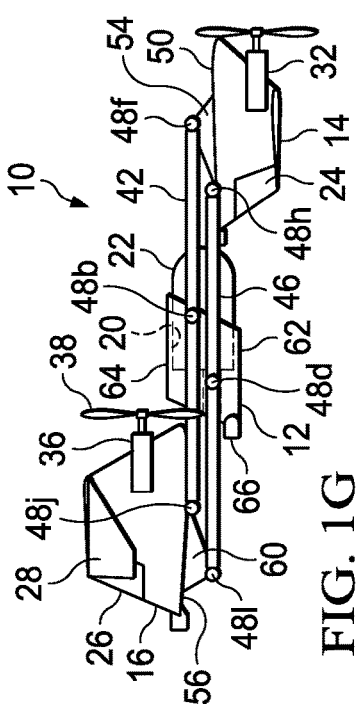
FIG. 1F
FIG. 1H
FIG. 1G

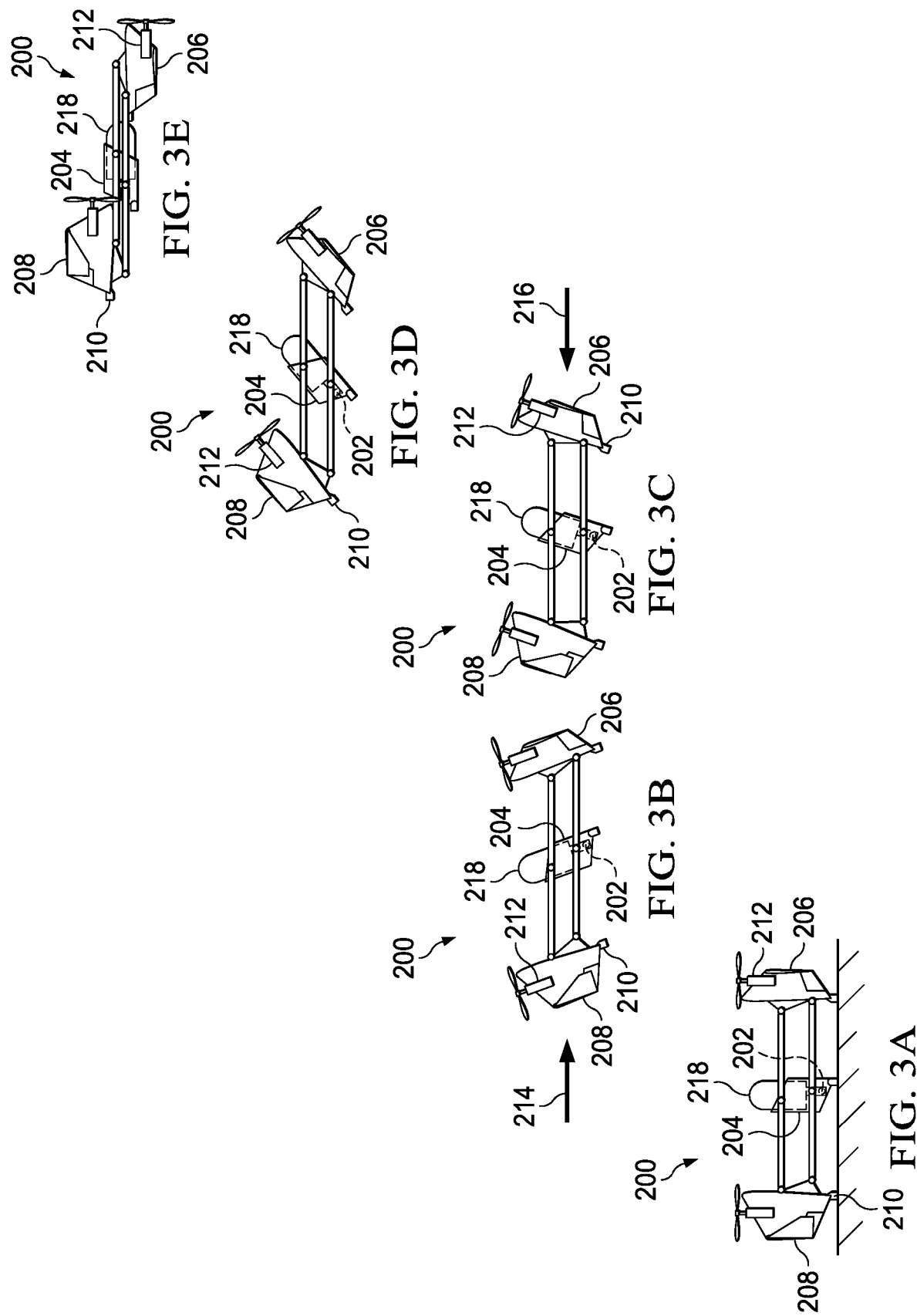

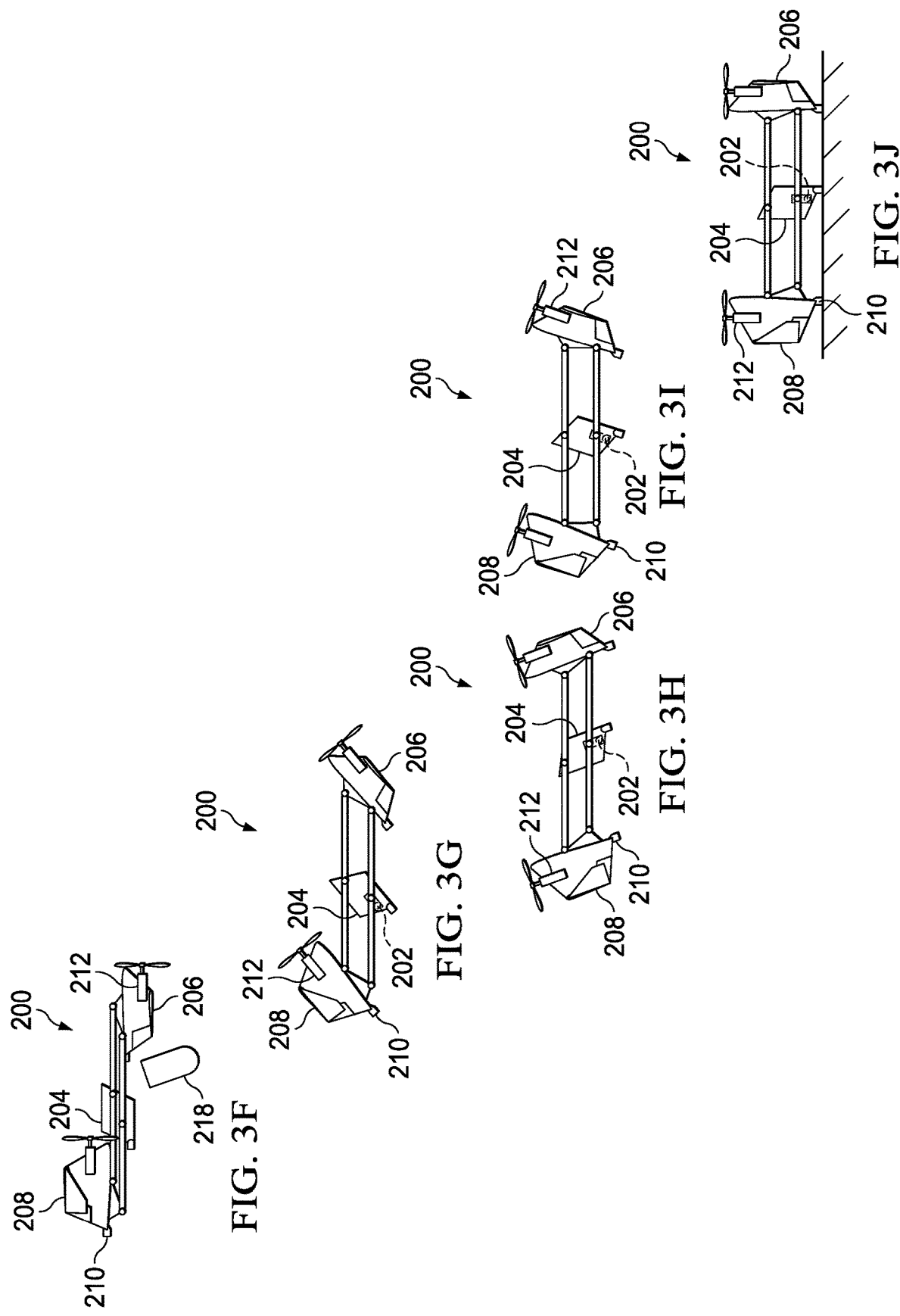

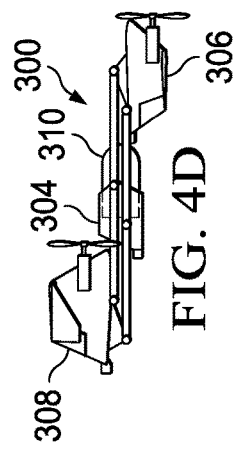

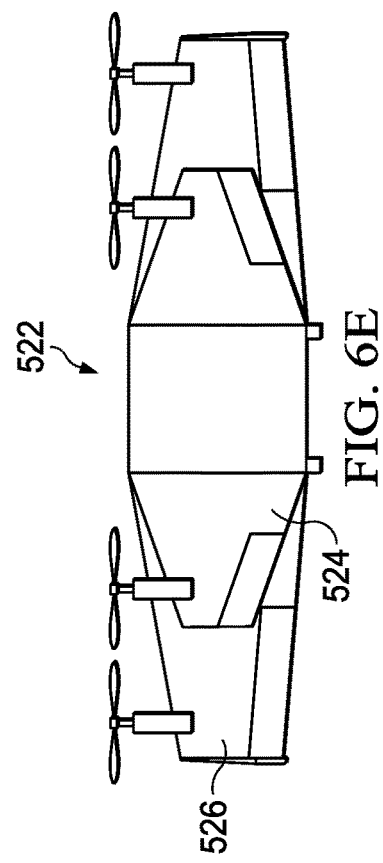
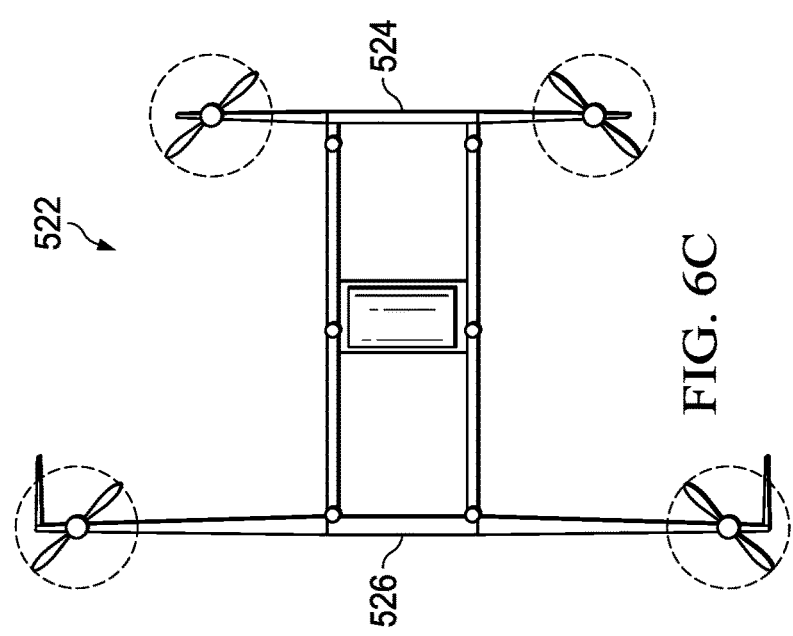
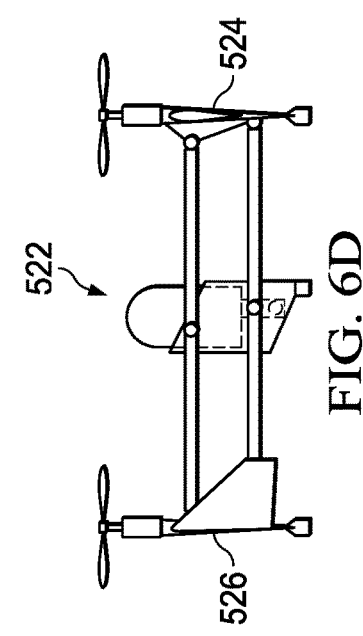

MULTIMODAL UNMANNED AERIAL SYSTEMS HAVING TILTABLE WINGS

TECHNICAL FIELD OF THE DISCLOSURE

The present disclosure relates, in general, to rotorcraft having tiltable wings and, in particular, to unmanned aerial systems having a tiltable fuselage and tiltable wings with an angular range of motion to allow for transitions between a vertical takeoff and landing flight mode and a forward flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing. Unmanned aerial systems that are configured as fixed-wing aircraft suffer from the same drawbacks as conventional fixed-wing aircraft.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression. Unmanned aerial systems that are configured as VTOL aircraft suffer from these and other drawbacks. For example, conventional rigid quadcopters have a large forward-facing profile in forward flight, which increases drag and reduces speed. Also, each rotor may require a separate tilt servomotor to compensate when landing in crosswinds and provide side thrust during hover operations, thereby increasing weight and complexity. Furthermore, the stability of rigid drone configurations in forward flight can be oversensitive to the placement of a payload and upper and lower proprotors may fail to efficiently compensate for pitch moment variations throughout the flight. Furthermore, rigid biplane drone configurations have a high vertical profile in forward flight, thus increasing drag. Several servomotors may also be needed to vector thrust for crosswind operation. Rigid drone configurations also suffer from inefficient and time-consuming landing trajectories.

Tiltwing aircraft utilize a wing capable of rotating between a vertical orientation in VTOL flight and a horizontal orientation in forward flight. A major drawback of tiltwing aircraft is a lack of control when subjected to crosswinds during hover due to the large vertical surface area of the wing. The fuselage of a tiltwing aircraft, which remains horizontal and presents a large flat surface to the downwash of the rotors in VTOL flight, also induces a drag effect that adversely affects downward thrust. Accordingly, a need has arisen for unmanned aerial systems that overcome these and other deficiencies of fixed-wing, VTOL and tiltwing aircraft.

SUMMARY

In a first aspect, the present disclosure is directed to a multimodal unmanned aerial system including a fuselage forming a payload bay, a control wing forward of the fuselage including a first plurality of propulsion assemblies and a primary wing aft of the fuselage including a second plurality of propulsion assemblies. The primary wing has a greater wingspan than the control wing. The multimodal unmanned aerial system includes linkages rotatably coupling the fuselage to the control wing and the primary wing. The fuselage, the control wing and the primary wing are configured to synchronously rotate between a vertical takeoff and landing flight mode and a forward flight mode. The fuselage, the control wing and the primary wing are substantially vertical in the vertical takeoff and landing flight mode and substantially horizontal in the forward flight mode.

In some embodiments, the fuselage may include an underside facing the control wing and a topside facing the primary wing in the vertical takeoff and landing flight mode. In certain embodiments, the fuselage may include a conversion motor configured to rotate at least one of the linkages to transition the fuselage, the control wing and the primary wing between the vertical takeoff and landing flight mode and the forward flight mode. In some embodiments, the fuselage may include a battery configured to power the propulsion assemblies. In certain embodiments, the control wing and the primary wing may each include movable control surfaces. In some embodiments, aft edges of the fuselage, the control wing and the primary wing may include landing members. In certain embodiments, the landing members may include shock absorbers. In some embodiments, the control wing and the primary wing may be forwardly and aftwardly tiltable in the vertical takeoff and landing flight mode to permit thrust vectoring. In certain embodiments, the control wing may be an anhedral wing and the primary wing may be a dihedral wing in the forward flight mode. In other embodiments, the control wing and the primary wing may be straight wings.

In some embodiments, the primary wing may be positioned higher than the control wing in the forward flight mode. In certain embodiments, the fuselage, the control wing and the primary wing may be rotatable in a range of motion of at least 90 degrees. In other embodiments, the fuselage, the control wing and the primary wing may be rotatable in a range of motion of approximately 180 degrees. In some embodiments, the fuselage, the control wing and the primary wing may transition between the vertical takeoff and landing flight mode and the forward flight mode using a differential thrust between the propulsion assemblies on the control wing and the propulsion assemblies on the primary wing. In certain embodiments, the fuselage, the control wing and the primary wing may be configured to synchronously rotate into an aftward flight mode in which the control wing trails the primary wing. In some embodiments, the fuselage, the control wing and the primary wing may be substantially horizontal in the aftward flight mode. In certain embodiments, the propulsion assemblies may be proprotor assemblies. In such embodiments, each proprotor assembly may include proprotor blades rotatable about an axis of rotation, and the axes of rotation may be noncollinear. In some embodiments, the linkages may include an upper linkage and a lower linkage, and the upper and lower linkages may be substantially parallel and/or substantially horizontal in both the vertical takeoff and landing flight mode and the forward flight mode. In certain embodiments, the linkages may include upper and lower linkages rotatably coupled to lateral sides of the fuselage. In other embodiments, the multimodal unmanned aerial system may include a releasable payload receivable in the payload bay.

In a second aspect, the present disclosure is directed to a rotorcraft including a fuselage forming a payload bay, a control wing forward of the fuselage including a first plurality of proprotor assemblies and a primary wing aft of the fuselage including a second plurality of proprotor assemblies. The primary wing has a greater wingspan than the control wing. The rotorcraft includes linkages rotatably coupling the fuselage to the control wing and the primary wing. The fuselage, the control wing and the primary wing are rotatable in a range of motion of approximately 180 degrees. The fuselage, the control wing and the primary wing are configured to synchronously rotate between a vertical takeoff and landing flight mode, a forward flight mode and an aftward flight mode. The fuselage, the control wing and the primary wing are substantially vertical in the vertical takeoff and landing flight mode and substantially horizontal in the forward flight mode and the aftward flight mode.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1H are schematic illustrations of a multimodal unmanned aerial system having a tiltable fuselage and tiltable wings in accordance with embodiments of the present disclosure;

FIGS. 3A-3J are schematic illustrations of a multimodal unmanned aerial system in a sequential takeoff, flight and landing operation scenario in accordance with embodiments of the present disclosure;

FIGS. 4A-4G are schematic illustrations of a multimodal unmanned aerial system in sequential flight operation scenarios for forward and aftward flight modes in accordance with embodiments of the present disclosure;

FIGS. 6A-6E are various views of different types of multimodal unmanned aerial systems having a tiltable fuselage and tiltable wings in accordance with embodiments of the present disclosure.

DETAILED DESCRIPTION

Figure 1A:
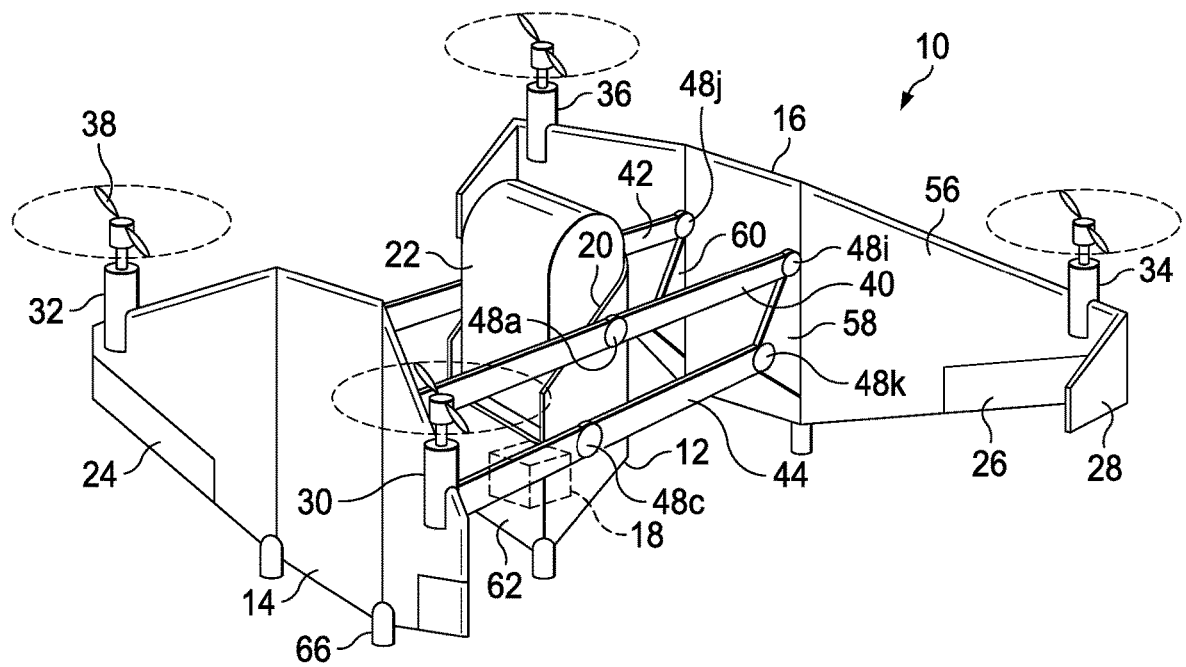
Figure 1B:
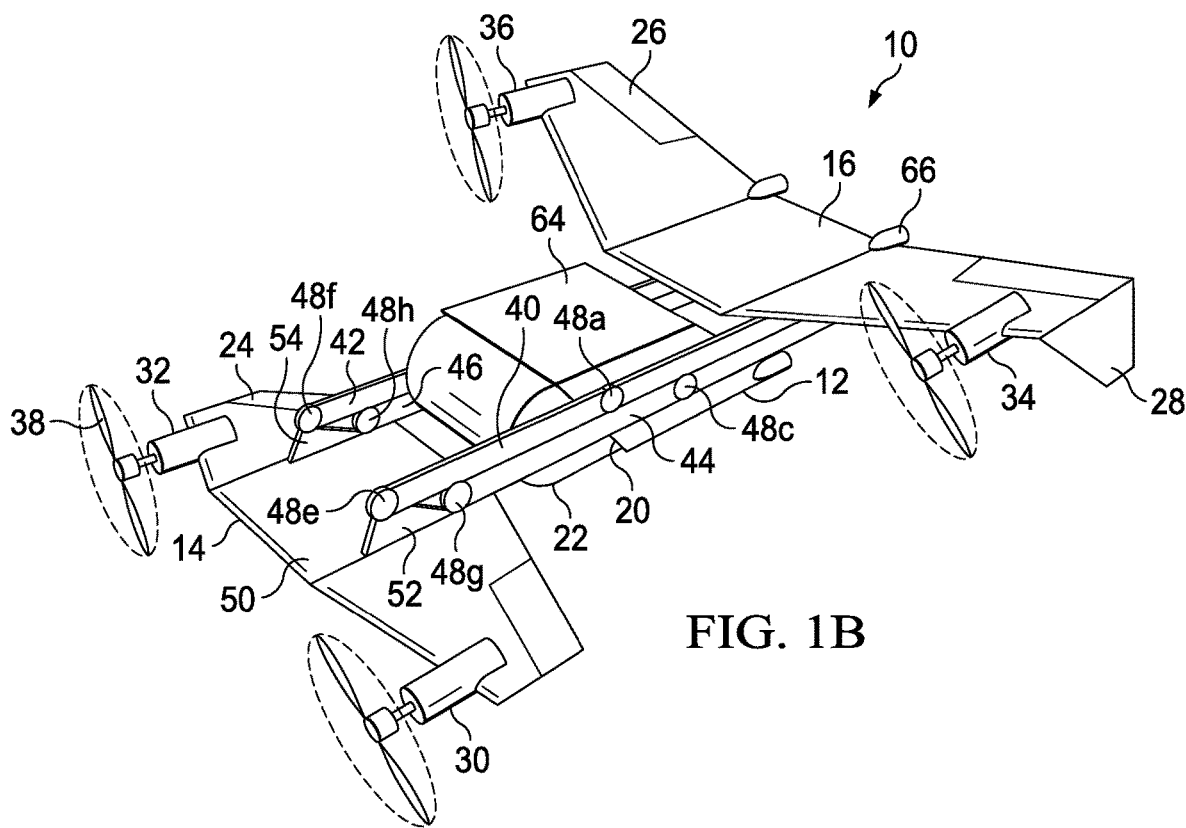

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1H in the drawings, a multimodal unmanned aerial system is schematically illustrated and generally designated 10. Multimodal unmanned aerial system 10 includes a fuselage 12 interposed between articulating wings 14, 16. Fuselage 12 houses a power system 18 to provide power to the various systems of multimodal unmanned aerial system 10. Power system 18 may include a battery, an internal combustion engine, a generator or any other type of power source. Fuselage 12 forms a payload bay 20 in which a payload 22 is received. In some embodiments, payload 22 may be a releasable payload that is secured to payload bay 20 while multimodal unmanned aerial system 10 is grounded, and which is released from payload bay 20 while multimodal unmanned aerial system 10 is either grounded or in flight. In such embodiments, payload bay 20 and payload 22 may include an engageable payload release mechanism (not shown) such as hooks, fasteners, magnets, rails, harnesses or any other releasable securing mechanisms. The different types of payloads that are receivable by payload bay 20 are numerous. For example, payload 22 may include a weapon, video camera, thermal camera, infrared imaging device, high definition camera, chemical sensor, cargo or any other suitable payload. In a more specific example, a weapon such as a bomb or cargo such as a deliverable package may be released from payload bay 20 either on the ground or during flight. Payload 22 may be configured to provide data to a flight control system of multimodal unmanned aerial system 10 and the flight control system may be configured to control, manipulate or release payload 22. In the illustrated embodiment, payload 22 is partially enclosed by payload bay 20 such that the forward end of payload 22 is exposed and the aft end of payload 22 is substantially enclosed within fuselage 12. In other embodiments, payload 22 may be fully enclosed within payload bay 20 of fuselage 12. In yet other embodiments, payload 22 may protrude from the aft end of fuselage 12 instead of from the forward end of fuselage 12. The weight distribution of multimodal unmanned aerial system 10 may be configured such that with or without payload 22, the center of gravity of multimodal unmanned aerial system 10 remains at or near fuselage 12.

Control wing 14 is forward of fuselage 12 and primary wing 16 is aft of fuselage 12. Primary wing 16 has a larger wingspan than control wing 14, although in other embodiments the wingspan of control wing 14 may be equal to or greater than the wingspan of primary wing 16. Control wing 14 has an anhedral wing configuration and primary wing 16 has a dihedral wing configuration. In other embodiments, control wing 14 may have a dihedral or straight wing configuration and primary wing 16 may have an anhedral or straight wing configuration. Movable control surfaces 24, 26 on the aft edges of wings 14, 16 manage the pitch, roll and yaw of multimodal unmanned aerial system 10 during flight. Fins 28 at the outboard ends of primary wing 16 provide additional flight stability. Control wing 14 may also include outboard fins in some embodiments.

Multiple propulsion assemblies are mounted to the forward edges of control wing 14 and primary wing 16. In particular, control wing 14 includes left and right proprotor assemblies 30, 32 and primary wing 16 includes left and right proprotor assemblies 34, 36. Proprotor assemblies 30, 32, 34, 36 each include a proprotor hub assembly and two proprotor blades 38, although in other embodiments proprotor assemblies 30, 32, 34, 36 can alternatively have a different number of rotor blades. Proprotor blades 38 have approximately the same length but could alternatively have nonuniform lengths. While proprotor assemblies 30, 32, 34, 36 are configured to rotate in a single direction, proprotor assemblies 30, 32, 34, 36 may rotate in either direction. For example, left and right proprotor assemblies 30, 32 may counterrotate relative to one another and left and right proprotor assemblies 34, 36 may also counterrotate relative to one another to balance the torque on multimodal unmanned aerial system 10. While proprotor blades 38 are illustrated as fixed pitch proprotor blades, proprotor blades 38 may alternatively be variable pitch proprotor blades operably connected to a swashplate and having collective and/or cyclic control. Proprotor assemblies 30, 32, 34, 36 are each capable of a variable rotational speed. The respective torques and revolutions per minute (RPMs) of proprotor assemblies 30, 32, 34, 36 may be independently controllable from one another, thereby allowing proprotor assemblies 30, 32, 34, 36 to have the same or differing torques, RPMs and resultant thrusts. For example, proprotor assemblies 30, 32 may spin faster than proprotor assemblies 34, 36 to produce a differential thrust between control wing 14 and primary wing 16. Power system 18 provides power to electric motors (not shown) in proprotor assemblies 30, 32, 34, 36. In other embodiments, fuselage 12 may also include a propulsion assembly such as a proprotor assembly or a pusher propeller.

Fuselage 12, control wing 14 and primary wing 16 are rotatably coupled to one another by upper linkages 40, 42 and lower linkages 44, 46. The middle sections or approximate midpoints of linkages 40, 42, 44, 46 are rotatably coupled to the lateral sides of fuselage 12 by revolute joints 48a, 48b, 48c, 48d. Upper linkages 40, 42 are rotatably coupled to the forward lateral sides of fuselage 12 and lower linkages 44, 46 are rotatably coupled to the aft lateral sides of fuselage 12. The forward ends of linkages 40, 42, 44, 46 are rotatably coupled to topside 50 of control wing 14 by revolute joints 48e, 48f, 48g, 48h. In particular, upper linkages 40, 42 are rotatably coupled to linkage fittings 52, 54, which are fixedly coupled to topside 50 of control wing 14. Lower linkages 44, 46 may be rotatably coupled to topside 50 of control wing 14 either directly or via linkage fittings 52, 54. The aft ends of linkages 40, 42, 44, 46 are rotatably coupled to underside 56 of primary wing 16 by revolute joints 48i, 48j, 48k, 48l. In particular, lower linkages 44, 46 are rotatably coupled to linkage fittings 58, 60, which are fixedly coupled to underside 56 of primary wing 16. Upper linkages 40, 42 may be rotatably coupled to underside 56 of primary wing 16 either directly or via linkage fittings 58, 60. While the illustrated embodiment includes four linkages 40, 42, 44, 46, fuselage 12 may be rotatably coupled to control wing 14 and primary wing 16 by any number of linkages such as one, two, six or eight linkages. Also, each linkage 40, 42, 44, 46 may be a single integral beam or alternatively formed from two or more linkage beam portions.

FIGS. 1A and 1C-1E illustrate multimodal unmanned aerial system 10 in a vertical takeoff and landing (VTOL) flight mode, which includes takeoff, landing and hover operations. In VTOL flight mode, proprotor assemblies 30, 32, 34, 36 are vertically oriented and proprotor blades 38 rotate in a substantially horizontal plane to provide a lifting thrust such that multimodal unmanned aerial system 10 flies much like a conventional helicopter. Fuselage 12, control wing 14 and primary wing 16 are substantially vertically oriented in VTOL flight mode such that underside 62 of fuselage 12 faces control wing 14 and topside 64 of fuselage 12 faces primary wing 16. As best seen in the top view of FIG. 1C, proprotor assemblies 30, 32, 34, 36 are configured similarly to a quadcopter configuration and multimodal unmanned aerial system 10 has a low profile when traveling in the upward direction. In some embodiments, flight direction in VTOL flight mode may be controlled by modulating the thrust generated by proprotor assemblies 30, 32, 34, 36. The aft edges of fuselage 12, control wing 14 and primary wing 16 each include two landing members 66 to provide ground support during takeoff and landing. Landing members 66 may include shock absorbers to provide structural protection for multimodal unmanned aerial system 10 during takeoff and landing.

FIGS. 1B and 1F-1H illustrate multimodal unmanned aerial system 10 in a forward flight mode, in which proprotor assemblies 30, 32, 34, 36 are horizontally oriented and proprotor blades 38 rotate in a substantially vertical plane to provide forward thrust while wings 14, 16 provide a lifting force similarly to a conventional propeller driven aircraft. Fuselage 12, control wing 14 and primary wing 16 are substantially horizontally oriented in forward flight mode. As best seen in the side view of FIG. 1G, primary wing 16 is positioned higher than control wing 14 in forward flight mode. As best seen in the front view of FIG. 1H, control wing 14 has an anhedral wing configuration and primary wing 16 has a dihedral wing configuration such that wings 14, 16 form an X-wing configuration in forward flight mode. In forward flight mode, control wing 14 acts as a canard wing to provide stability and control for multimodal unmanned aerial system 10. Pitch in forward flight may be controlled by symmetric motion of movable control surfaces 24, 26 about longitudinal centerline 68 of multimodal unmanned aerial system 10. Roll in forward flight may be controlled by asymmetric motion of movable control surfaces 24, 26 about longitudinal centerline 68 of multimodal unmanned aerial system 10. Yaw in forward flight may be controlled via use of differential rotor RPM. As best seen in the front view of FIG. 1H, multimodal unmanned aerial system 10 has a low forward-facing profile during forward flight to reduce drag and allow for increased mission range and efficiency. The geometry and weight distribution of multimodal unmanned aerial system 10 is such that fuselage 12 has clearance to drop payload 22 during forward flight and multimodal unmanned aerial system 10 may continue to fly without payload 22. As best seen in FIGS. 1D and 1G, upper linkages 40, 42 and lower linkages 44, 46 remain substantially horizontal and substantially parallel to one another in both VTOL flight mode and forward flight mode. As best seen in FIGS. 1C and 1H, axes of rotation 70, 72, 74, 76 of proprotor assemblies 30, 32, 34, 36 are noncollinear in both VTOL fight mode and forward flight mode.

Fuselage 12, control wing 14 and primary wing 16 synchronously rotate when moving between VTOL flight mode and forward flight mode. Fuselage 12, control wing 14 and primary wing 16 have a generally 90 degree range of motion between VTOL flight mode and forward flight mode. In some embodiments, fuselage 12, control wing 14 and primary wing 16 may have a 180 degree range of motion such that multimodal unmanned aerial system 10 is convertible between forward flight mode and VTOL flight mode as well as an aftward flight mode in which control wing 14 trails primary wing 16 in aftward flight. Fuselage 12 houses a conversion motor 78 configured to rotate one or more of linkages 40, 42, 44, 46 relative to fuselage 12 to transition fuselage 12, control wing 14 and primary wing 16 between VTOL flight mode and forward flight mode. Conversion motor 78 may be any type of motor such as a servomotor or stepper motor. Multimodal unmanned aerial system 10 may include any number of conversion motors to rotate linkages 40, 42, 44, 46, fuselage 12, control wing 14 and/or primary wing 16. In addition to or in lieu of conversion motor 78, multimodal unmanned aerial system 10 may use differential thrust to transition fuselage 12, control wing 14 and primary wing 16 between VTOL flight mode and forward flight mode. For example, the thrust generated by proprotor assemblies 30, 32 on control wing 14 may differ from the thrust generated by proprotor assemblies 34, 36 on primary wing 16 to transition multimodal unmanned aerial system 10 between modes. In such embodiments, a clutch (not shown) may be included and configured to lock control wing 14 and primary wing 16 in predetermined positions, such as vertical or horizontal positions, when control wing 14 and primary wing 16 reach sequenced predetermined positions in response to the thrust difference between proprotor assemblies 30, 32 and proprotor assemblies 34, 36. While hovering in VTOL flight mode, conversion motor 78 and/or thrust differentiation may be utilized to forwardly and/or aftwardly tilt or angle control wing 14 and primary wing 16 to permit thrust vectoring, thus allowing multimodal unmanned aerial system 10 to maintain a desired hover position in high crosswinds. Prior drone configurations have required two or more tilt servomotors, one at each rotor, for crosswind control. Multimodal unmanned aerial system 10 has no such requirement and therefore benefits from reduced weight and complexity.

Multimodal unmanned aerial system 10 may be any size or weight based on many factors such as desired payload or intended functionality. Multimodal unmanned aerial system 10 may also be scalable to any size from miniature drone implementations to piloted implementations. For example, multimodal unmanned aerial system 10 may be implemented as a micro unmanned aerial system, mini VTOL vehicle or hobbyist aircraft for recreational use. In other embodiments, multimodal unmanned aerial system 10 may be one of a multitude of deployable swarm unmanned aerial systems capable of intercommunication and coordinated missions. Multimodal unmanned aerial system 10 may be easily storable and deployable for ease of transport when not in use. It should be appreciated that multimodal unmanned aerial system 10 is merely illustrative of a variety of aircraft that can implement the features and embodiments disclosed herein. For example, those skilled in the art will recognize that tiltable fuselage 12, tiltable wings 14, 16 and/or linkages 40, 42, 44, 46 therebetween disclosed herein can be integrated into a variety of aircraft configurations. It should be appreciated that even though aircraft are particularly well-suited to implement the features and embodiments of the present disclosure, non-aircraft vehicles and devices can also implement the embodiments.

Figure 2:
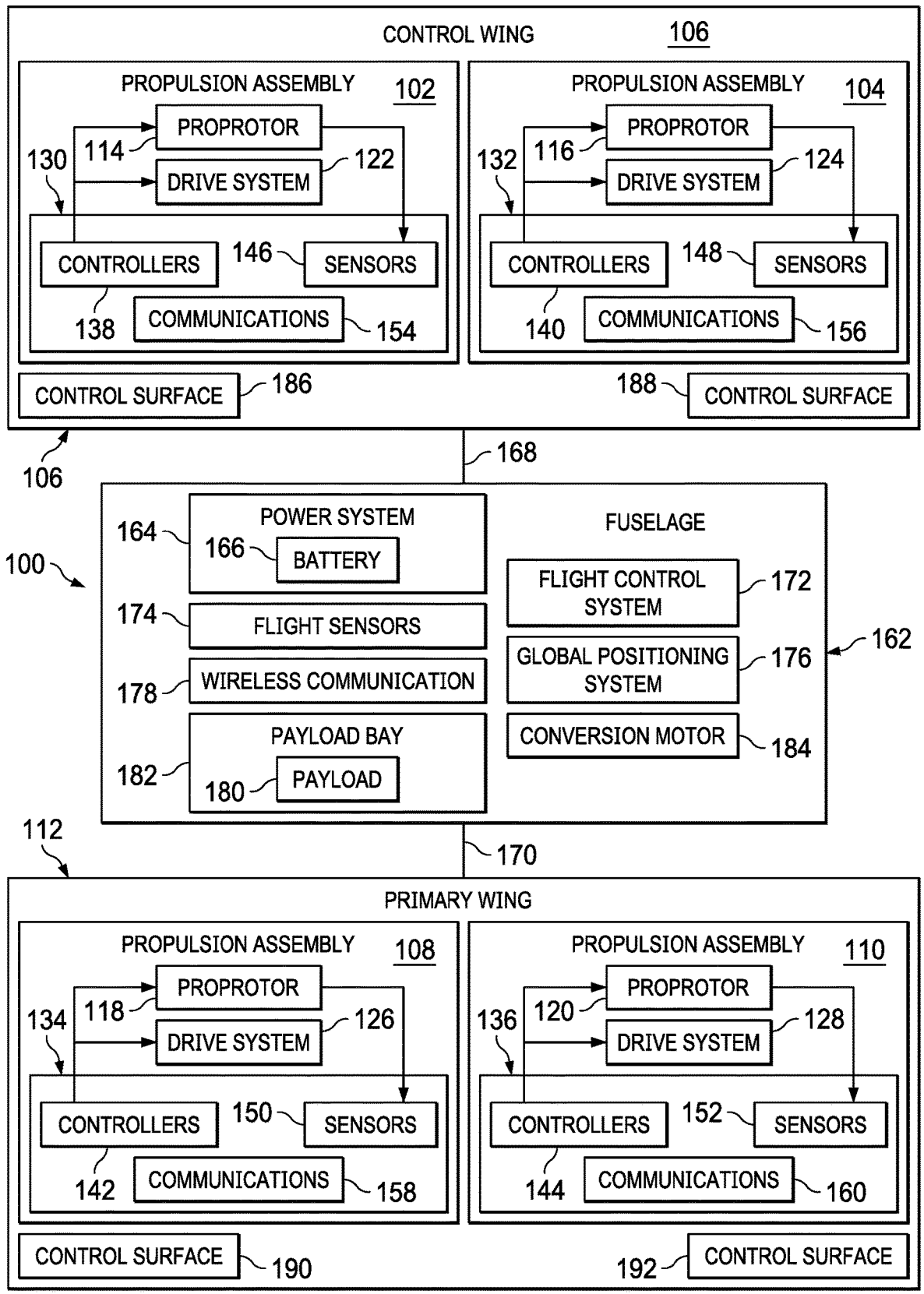
FIG. 2 is a block diagram of a propulsion and control system for a multimodal unmanned aerial system having a tiltable fuselage and tiltable wings in accordance with embodiments of the present disclosure.

Referring to FIG. 2 in the drawings, a propulsion and control system for a multimodal unmanned aerial system is schematically illustrated and generally designated 100. Propulsion assemblies 102, 104 on control wing 106 and propulsion assemblies 108, 110 on primary wing 112 each include a proprotor 114, 116, 118, 120, a drive system 122, 124, 126, 128 including an electric motor and an electronics node 130, 132, 134, 136 including, for example, controllers 138, 140, 142, 144, sensors 146, 148, 150, 152 and communications elements 154, 156, 158, 160, respectively, as well as other components suitable for use in the operation of propulsion assemblies 102, 104, 108, 110. Each proprotor 114, 116, 118, 120 includes a plurality of proprotor blades radiating therefrom.

Fuselage 162 includes power system 164 that may serve as the electrical energy source for propulsion assemblies 102, 104, 108, 110, including proprotors 114, 116, 118, 120, drive systems 122, 124, 126, 128 and electronics nodes 130, 132, 134, 136. Power system 164 may include one or more batteries 166. Battery 166 may be charged by an electrical energy generation system (not shown), such as an internal combustion engine, or may be charged at a ground station. Battery 166 may also be interchangeably removed and installed to enable efficient refueling which may be particularly beneficial in embodiments of multimodal unmanned aerial system 100 wherein the sole electrical energy source is battery 166. In embodiments that include an electrical energy generation system such as an internal combustion engine housed within fuselage 162, the electrical energy generation system may include one or more fuel tanks such as liquid fuel tanks. In one non-limiting example, an internal combustion engine may be used to drive an electric generator that produces electrical energy that is fed to propulsion assemblies 102, 104, 108, 110 via communication lines 168, 170 to power proprotors 114, 116, 118, 120, drive systems 122, 124, 126, 128 and electronics nodes 130, 132, 134, 136. In other embodiments, multimodal unmanned aerial system 100 may implement a hybrid power system including both an internal combustion engine and batteries. This type of hybrid power system may be beneficial in that the energy density of liquid fuel exceeds that of batteries enabling greater endurance for multimodal unmanned aerial system 100. In the hybrid power system, battery 166 may provide a backup electrical power source to enable multimodal unmanned aerial system 100 to safely land in the event of a failure of the internal combustion engine. In yet other embodiments, each propulsion assembly 102, 104, 108, 110 may include a respective battery to provide backup battery power in the event of a failure of power system 164. As another alternative, propulsion assemblies 102, 104, 108, 110 may include hydraulic motors operated within a common hydraulic fluid system wherein one or more high pressure hydraulic sources or generators are housed within fuselage 162 to provide power to each of the hydraulic motors.

In the illustrated embodiment, multimodal unmanned aerial system 100 includes a flight control system 172 housed within fuselage 162. Flight control system 172, such as a digital flight control system, may preferably be a redundant flight control system and more preferably a triply redundant flight control system including three independent flight control computers. Use of triply redundant flight control system 172 improves the overall safety and reliability of multimodal unmanned aerial system 100 in the event of a failure of flight control system 172. Flight control system 172 preferably includes non-transitory computer readable storage media including a set of computer instructions executable by one or more processors for controlling the operation of propulsion assemblies 102, 104, 108, 110. Flight control system 172 may be implemented on one or more general purpose computers, special purpose computers or other machines with memory or processing capability. For example, flight control system 172 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 172 may be a microprocessor-based system operable to execute program code in the form of machine executable instructions. In addition, flight control system 172 may be selectively connectable to other computer systems via a proprietary encrypted network, a public encrypted network, the Internet or other suitable communication network that may include both wired and wireless connections.

Flight control system 172 communicates via a wired and/or wireless communications network with electronics nodes 130, 132, 134, 136 of each propulsion assembly 102, 104, 108, 110. In some embodiments, electronics nodes 130, 132, 134, 136 may instead be combined and centralized into fuselage 162. Flight control system 172 receives sensor data from and sends flight command information to electronics nodes 130, 132, 134, 136 such that each propulsion assembly 102, 104, 108, 110 may be individually and independently controlled and operated. Flight control system 172 is configured to receive inputs from flight sensors 174 such as, but not limited to, gyroscopes, accelerometers or any other suitable sensing equipment configured to provide flight control system 172 with spatial, positional or force dynamics information, feedback or other data that may be utilized to manage the operation of multimodal unmanned aerial system 100. For example, flight control system 172 may use sensor data from flight sensors 174 to generate and send flight command information to electronics node 130 to control propulsion assembly 102. Multimodal unmanned aerial system 100 may include global positioning system 176 configured to determine, receive and/or provide data related to the location of multimodal unmanned aerial system 100 including flight destinations, targets, no-fly zones, preplanned routes, flight paths or any other geospatial location-related information. Global positioning system 176 may be configured for bidirectional communication with flight control system 172, unidirectional communication from global positioning system 176 to flight control system 172 or unidirectional communication from flight control system 172 to global positioning system 176.

Multimodal unmanned aerial system 100 may include wireless communication components 178 such as radio communication equipment configured to send and receive signals related to flight commands or other operational information. Wireless communication components 178 may be configured to transmit video, audio or other data gathered, observed or otherwise generated, carried by or obtained by multimodal unmanned aerial system 100. In some embodiments, flight control system 172 may also be operable to communicate with one or more remote systems via wireless communication components 178 using a wireless communications protocol. The remote systems may be operable to receive flight data from and provide commands to flight control system 172 to enable flight control over some or all aspects of flight operation. In alternative embodiments, multimodal unmanned aerial system 100 may instead be a manned or piloted vehicle. In both manned and unmanned missions, flight control system 172 may autonomously control some or all aspects of flight operation. Transitions between VTOL flight mode and forward flight mode may be accomplished responsive to remote flight control, autonomous flight control, onboard pilot flight control or combinations thereof.

Payload 180 is receivable by payload bay 182 and may include a video camera, thermal camera, infrared imaging device, high definition camera, weapon, chemical sensor, cargo or any other suitable payload. Payload 180 may be configured to provide data to flight control system 172 and flight control system 172 may be configured to control, manipulate or release payload 180. Power system 164 may provide power to conversion motor 184 for transitions between VTOL flight mode and forward flight mode. Power system 164 may also provide power to control surfaces 186, 188, 190, 192 on control wing 106 and primary wing 112 for pitch, roll and yaw control.

Referring to FIGS. 3A-3J in the drawings, a sequential takeoff, flight and landing scenario of multimodal unmanned aerial system 200 is depicted. Multimodal unmanned aerial system 200 includes conversion motor 202 to rotate fuselage 204, control wing 206 and primary wing 208 between VTOL flight mode and forward flight mode. In FIG. 3A, multimodal unmanned aerial system 200 is in VTOL flight mode at takeoff and resting on landing members 210. Proprotor assemblies 212 lift multimodal unmanned aerial system 200 into a hover mode shown in FIGS. 3B and 3C. While hovering, multimodal unmanned aerial system 200 may encounter crosswinds 214, 216. Fuselage 204, control wing 206 and primary wing 208 are forwardly and aftwardly tiltable within an angular range of motion to generate both vertical and lateral thrust components to provide lift while countering crosswinds 214, 216. The angular range of motion of fuselage 204, control wing 206 and primary wing 208 required to counteract crosswinds 214, 216 may vary widely depending on the strength of crosswinds 214, 216. Multimodal unmanned aerial system 200 may be considered to be in a crosswind configuration when hovering and combating crosswinds 214, 216 in this manner. Multimodal unmanned aerial system 200 may also include a crosswind sensor (not shown) that detects crosswinds 214, 216 and enables multimodal unmanned aerial system 200 to determine the tilt or angle of fuselage 204, control wing 206 and primary wing 208 necessary to counter crosswinds 214, 216. Fuselage 204, control wing 206 and primary wing 208 may be tilted to counteract crosswinds 214, 216 using conversion motor 202 or thrust differentiation. Vehicle yaw orientation in relation to crosswinds 214, 216 may be achieved via asymmetric deflection of control surfaces such as control surfaces 24, 26 in FIGS. 1A-1H.

In FIG. 3D, conversion motor 202 rotates fuselage 204, control wing 206 and primary wing 208 into the forward flight mode shown in FIG. 3E. Multimodal unmanned aerial system 200 maintains a low profile in forward flight mode to increase range, efficiency and speed. Payload 218 may be released from the payload bay of fuselage 204 while multimodal unmanned aerial system 200 is in forward flight mode as shown in FIG. 3F. When it is desired that multimodal unmanned aerial system 200 return to hover mode or to land, conversion motor 202 rotates fuselage 204, control wing 206 and primary wing 208 toward the vertical orientation of VTOL flight mode as shown in FIG. 3G. Multimodal unmanned aerial system 200 is capable of landing without the need to increase altitude before converting to VTOL flight mode, unlike some current rigid drone configurations. Multimodal unmanned aerial system 200 thus benefits from a more efficient landing trajectory. Upon rotating back into hover mode as shown in FIGS. 3H and 3I, multimodal unmanned aerial system 200 may again have the ability to forwardly and aftwardly tilt fuselage 204, control wing 206 and primary wing 208 to counter any crosswinds. Multimodal unmanned aerial system 200 may then land on a surface using landing members 210 as shown in FIG. 3J.

Referring to FIGS. 4A-4G in the drawings, a sequential flight scenario of multimodal unmanned aerial system 300 is depicted. Conversion motor 302 rotates fuselage 304, control wing 306 and primary wing 308 in a 180 degree range of motion to allow multimodal unmanned aerial system 300 to convert into both the forward flight mode shown in FIG. 4D and the aftward flight mode shown in FIG. 4G. The conversion into forward flight mode shown in FIGS. 4A-4D is similar to that described above with regard to multimodal unmanned aerial system 200 in FIGS. 3A-3J. Fuselage 304, control wing 306 and primary wing 308 of multimodal unmanned aerial system 300, however, are capable of synchronously rotating in the opposite direction to fly backwards. In the aftward flight mode shown in FIG. 4G, wings 306, 308 are both substantially horizontally oriented and control wing 306 trails primary wing 308. Multimodal unmanned aerial system 300 thus benefits from two cruise configurations: the canard configuration shown in FIG. 4D and the tailwing configuration shown in FIG. 4G. Each configuration provides its own unique advantages. For example, the canard configuration of FIG. 4D may provide additional lift, increased aerodynamic efficiency and increased flexibility for the location of payload 310. Conversely, the tailwing configuration of FIG. 4G may provide additional flight stability. The ability to convert into either forward or aftward flight mode from the hover mode of FIG. 4A provides additional tactical capability, as may be necessary when moving quickly away from an identifiable threat.

Figure 5:
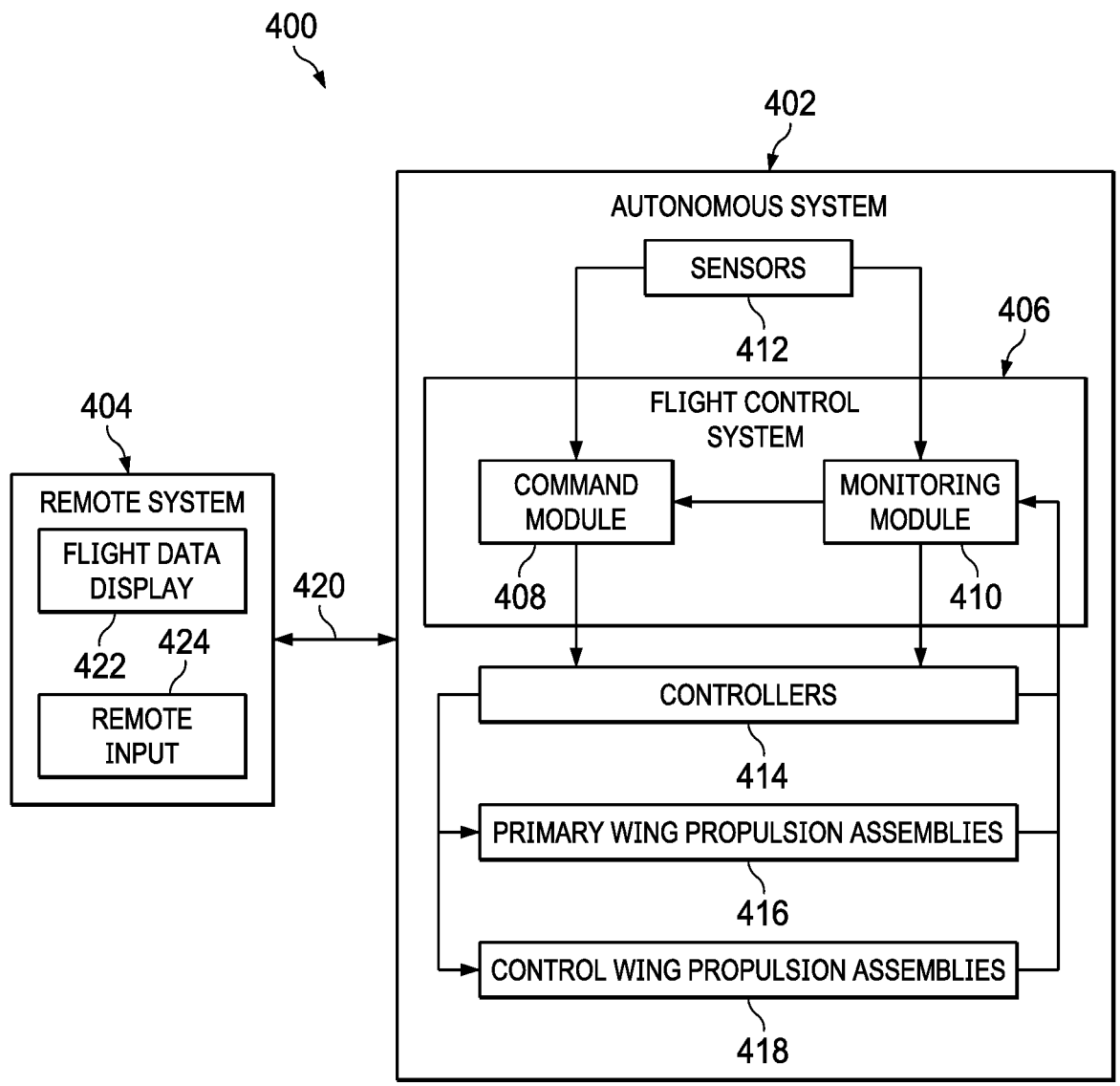
FIG. 5 is a block diagram of a control system for a multimodal unmanned aerial system having a tiltable fuselage and tiltable wings in accordance with embodiments of the present disclosure.

Referring to FIG. 5 in the drawings, a block diagram depicts a control system 400 operable for use with a multimodal unmanned aerial system, such as multimodal unmanned aerial system 10 of FIGS. 1A-1H, of the present disclosure. In the illustrated embodiment, control system 400 includes two primary computer-based subsystems, namely, an autonomous system 402 and a remote system 404. As discussed herein, the multimodal unmanned aerial system of the present disclosure may be operated autonomously responsive to commands generated by flight control system 406 that preferably includes a non-transitory computer readable storage medium including a set of computer instructions executable by a processor. Flight control system 406 may be a triply redundant system implemented on one or more general purpose computers, special purpose computers or other machines with memory and processing capability. For example, flight control system 406 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 406 may be a microprocessor-based system operable to execute program code in the form of machine executable instructions. In addition, flight control system 406 may be selectively connectable to other computer systems via a proprietary encrypted network, a public encrypted network, the Internet or other suitable communication network that may include both wired and wireless connections.

In the illustrated embodiment, flight control system 406 includes a command module 408 and a monitoring module 410. It is to be understood by those skilled in the art that these and other modules executed by flight control system 406 may be implemented in a variety of forms including hardware, software, firmware, special purpose processors and combinations thereof. Flight control system 406 receives input from a variety of sources including internal sources such as sensors 412, controllers 414, primary wing propulsion assemblies 416 and control wing propulsion assemblies 418 as well as external sources such as remote system 404, global positioning system satellites or other location positioning systems and the like. For example, flight control system 406 may receive a flight plan including starting and ending locations for a mission from remote system 404. Thereafter, flight control system 406 is operable to autonomously control all aspects of flight of the multimodal unmanned aerial system, including transitioning the multimodal unmanned aerial system between VTOL flight mode and forward flight mode. Indeed, autonomous system 402 is capable of performing any programmed mission.

In one example, during the various operating modes of the multimodal unmanned aerial system including VTOL flight mode, forward flight mode, aftward flight mode and transitions therebetween, command module 408 provides commands to controllers 414. These commands enable operation of propulsion assemblies 416, 418 including, for example, controlling the rotational speed of the proprotors, changing the pitch of the proprotor blades, adjusting thrust vectors and the like. In addition, these commands enable transition of the multimodal unmanned aerial system between a vertical lift orientation and a forward thrust orientation. Flight control system 406 receives feedback from controllers 414 and propulsion assemblies 416, 418. Monitoring module 410 processes this feedback and supplies correction data and other information to command module 408 and/or controllers 414. Sensors 412 such as positioning sensors, attitude sensors, speed sensors, torque sensors, environmental sensors, fuel sensors, battery level sensors, temperature sensors, location sensors, wing tilt sensors, fuselage tilt sensors and the like also provide information to flight control system 406 to further enhance autonomous control capabilities.

Some or all of the autonomous control capability of flight control system 406 can be augmented or supplanted by remote flight control system 404. Remote system 404 may include one or more computing systems that may be implemented on general purpose computers, special purpose computers or other machines with memory and processing capability. For example, the computing systems may include one or more memory storage modules including, but not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet or any other type of network that couples a plurality of computers to enable various modes of communication via network messages using suitable communication techniques, such as transmission control protocol/internet protocol, file transfer protocol, hypertext transfer protocol, internet protocol, security protocol, point-to-point tunneling protocol, secure sockets layer protocol or other suitable protocol. Remote system 404 communicates with flight control system 406 via a communication link 420 that may include both wired and wireless connections.

Remote system 404 preferably includes one or more flight data display devices 422 configured to display information relating to one or more aerial vehicles of the present disclosure. Display device 422 may be configured in any suitable form, including, for example, liquid crystal displays, light-emitting diode displays, cathode ray tube displays or any suitable type of display. Remote system 404 may also include audio output and input devices such as a microphone, speakers and/or audio port allowing an operator to communicate with, for example, other personnel involved with the operation of the multimodal unmanned aerial system. Display device 422 may also serve as a remote input device 424 if a touchscreen display implementation is used, however, other remote input devices, such as a keyboard or joysticks, may alternatively be used to allow an operator to provide control commands to the multimodal unmanned aerial system being operated responsive to remote control. While control system 400 is intended for an unmanned aerial system, in some embodiments control system 400 may include a pilot system (not shown) that allows a pilot onboard the aircraft to interact with remote system 404 and/or autonomous system 402 to pilot the aircraft. As should be apparent to those having ordinary skill in the art, through the use of control system 400, a multimodal unmanned aerial system of the present disclosure can be operated responsive to a flight control protocol including autonomous flight control, remote flight control and combinations thereof.

Figure 6A:
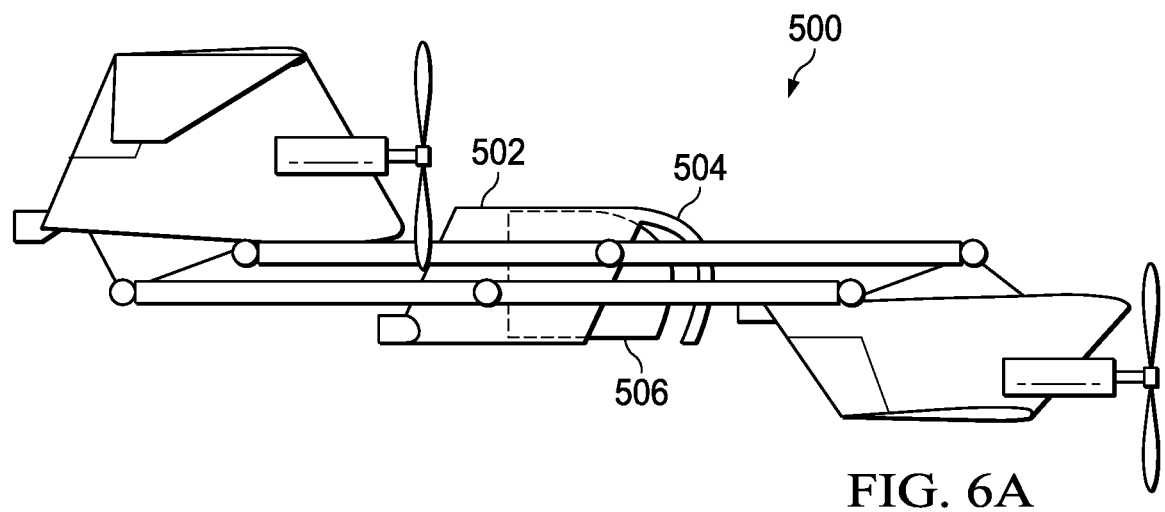
Figure 6B:
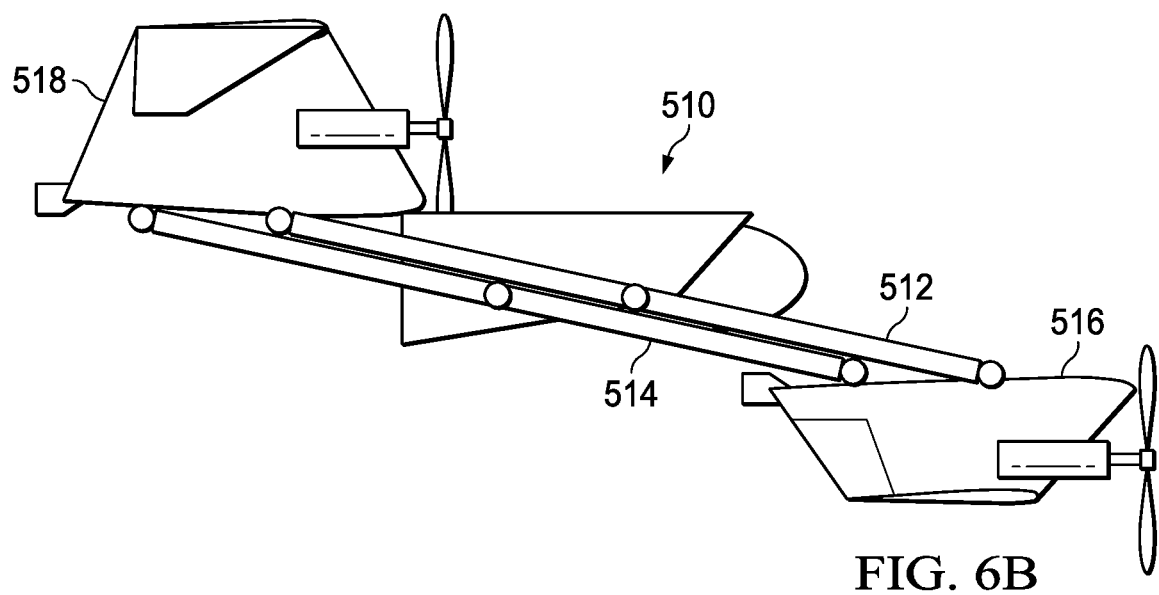

Referring to FIGS. 6A-6E in the drawings, different configurations of a multimodal unmanned aerial system are schematically illustrated and depicted. In FIG. 6A, multimodal unmanned aerial system 500 includes fuselage 502 having a fairing 504 to protect payload 506 and/or to improve the aerodynamic profile of fuselage 502 during flight. Fairing 504 may be configured to pivot, move or break away from fuselage 502 to provide release clearance for payload 506. FIG. 6B shows multimodal unmanned aerial system 510 in forward flight mode. Upper and lower linkages 512, 514 have a diagonal, instead of horizontal, orientation during forward flight mode. Multimodal unmanned aerial system 510 also omits linkage fittings, such as linkage fittings 52, 54 in FIGS. 1A-1H, so that linkages 512, 514 are rotatably coupled directly to control wing 516 and primary wing 518. In FIGS. 6C-6E, multimodal unmanned aerial system 522 includes control wing 524 and primary wing 526, which each have a straight wing configuration. Multimodal unmanned aerial system 522 may perform the same or similar flight scenarios in the straight wing configuration as those shown for multimodal unmanned aerial systems 200 and 300 in FIGS. 3A-3J and 4A-4G for an X-wing configuration.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A multimodal unmanned aerial system comprising:
a fuselage forming a payload bay;
a control wing forward of the fuselage including a first plurality of propulsion assemblies; a primary wing aft of the fuselage including a second plurality of propulsion assemblies, the primary wing having a greater wingspan than the control wing; and
a plurality of linkages rotatably coupling the fuselage to the control wing and the primary wing;
wherein, the fuselage, the control wing and the primary wing are configured to synchronously rotate between a vertical takeoff and landing flight mode and a forward flight mode, the fuselage, the control wing and the primary wing substantially vertical in the vertical takeoff and landing flight mode and substantially horizontal in the forward flight mode; and
wherein, the fuselage, the control wing and the primary wing are configured to synchronously rotate into an aftward flight mode, the control wing trailing the primary wing in the aftward flight mode.

2. The multimodal unmanned aerial system as recited in claim 1 wherein the fuselage includes an underside facing the control wing and a topside facing the primary wing in the vertical takeoff and landing flight mode.

3. The multimodal unmanned aerial system as recited in claim 1 wherein the fuselage further comprises a conversion motor configured to rotate at least one of the plurality of linkages to transition the fuselage, the control wing and the primary wing between the vertical takeoff and landing flight mode and the forward flight mode.

4. The multimodal unmanned aerial system as recited in claim 1 wherein the fuselage further comprises a battery configured to power the propulsion assemblies.

5. The multimodal unmanned aerial system as recited in claim 1 wherein the control wing and the primary wing each further comprise a plurality of movable control surfaces.

6. The multimodal unmanned aerial system as recited in claim 1 wherein aft edges of the fuselage, the control wing and the primary wing include a plurality of landing members.

7. The multimodal unmanned aerial system as recited in claim 1 wherein the control wing and the primary wing are forwardly and aftwardly tiltable in the vertical takeoff and landing flight mode to permit thrust vectoring.

8. The multimodal unmanned aerial system as recited in claim 1 wherein the control wing further comprises an anhedral wing and the primary wing further comprises a dihedral wing in the forward flight mode.

9. The multimodal unmanned aerial system as recited in claim 1 wherein the control wing and the primary wing further comprise straight wings.

10. The multimodal unmanned aerial system as recited in claim 1 wherein the primary wing is positioned higher than the control wing in the forward flight mode.

11. The multimodal unmanned aerial system as recited in claim 1 wherein the fuselage, the control wing and the primary wing are rotatable in a range of motion of at least 90 degrees.

12. The multimodal unmanned aerial system as recited in claim 1 wherein the fuselage, the control wing and the primary wing are rotatable in a range of motion of approximately 180 degrees.

13. The multimodal unmanned aerial system as recited in claim 1 wherein the fuselage, the control wing and the primary wing transition between the vertical takeoff and landing flight mode and the forward flight mode using a differential thrust between the first plurality of propulsion assemblies on the control wing and the second plurality of propulsion assemblies on the primary wing.

14. The multimodal unmanned aerial system as recited in claim 1 wherein the fuselage, the control wing and the primary wing are substantially horizontal in the aftward flight mode.

15. The multimodal unmanned aerial system as recited in claim 1 wherein the plurality of linkages further comprise an upper linkage and a lower linkage, the upper and lower linkages substantially parallel in both the vertical takeoff and landing flight mode and the forward flight mode.

16. The multimodal unmanned aerial system as recited in claim 1 wherein the plurality of linkages further comprise an upper linkage and a lower linkage, the upper and lower linkages substantially horizontal in both the vertical takeoff and landing flight mode and the forward flight mode.

17. The multimodal unmanned aerial system as recited in claim 1 wherein the plurality of linkages further comprise a plurality of upper linkages and a plurality of lower linkages rotatably coupled to lateral sides of the fuselage.

18. The multimodal unmanned aerial system as recited in claim 1 further comprising a releasable payload receivable in the payload bay.

19. A rotorcraft comprising:
a fuselage forming a payload bay;
a control wing forward of the fuselage including a first plurality of proprotor assemblies;
a primary wing aft of the fuselage including a second plurality of proprotor assemblies, the primary wing having a greater wingspan than the control wing; and
a plurality of linkages rotatably coupling the fuselage to the control wing and the primary wing;
wherein, the fuselage, the control wing and the primary wing are rotatable in a range of motion of approximately 180 degrees; and
wherein, the fuselage, the control wing and the primary wing are configured to synchronously rotate between a vertical takeoff and landing flight mode, a forward flight mode and an aftward flight mode, the fuselage, the control wing and the primary wing substantially vertical in the vertical takeoff and landing flight mode and substantially horizontal in the forward flight mode and the aftward flight mode, the control wing trailing the primary wing in the aftward flight mode.

* * * * *